US011375340B2

(12) United States Patent
Kim

(10) Patent No.: US 11,375,340 B2
(45) Date of Patent: Jun. 28, 2022

(54) APPARATUS AND METHOD FOR PERFORMING POSITIONING

(71) Applicant: KT CORPORATION, Gyeonggi-do (KR)

(72) Inventor: Ki-tae Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/983,917

(22) Filed: Aug. 3, 2020

(65) Prior Publication Data
US 2021/0044932 A1 Feb. 11, 2021

(30) Foreign Application Priority Data

Aug. 9, 2019 (KR) .................. 10-2019-0097764
May 25, 2020 (KR) .................. 10-2020-0062303

(51) Int. Cl.
*H04W 4/029* (2018.01)
*G01S 5/10* (2006.01)

(52) U.S. Cl.
CPC .............. *H04W 4/029* (2018.02); *G01S 5/10* (2013.01)

(58) Field of Classification Search
CPC ................................ H04W 4/029; G01S 5/10
See application file for complete search history.

(56) References Cited

U.S. PATENT DOCUMENTS

| 2015/0189574 | A1* | 7/2015 | Ng ........................ | H04W 24/08 |
| | | | | 370/252 |
| 2019/0229881 | A1* | 7/2019 | Zhao ...................... | H04L 5/0051 |
| 2020/0092737 | A1* | 3/2020 | Siomina ................ | H04W 24/10 |
| 2020/0267686 | A1* | 8/2020 | Hunukumbure ....... | H04W 4/029 |
| 2021/0126754 | A1* | 4/2021 | Da ........................ | H04L 5/0048 |
| 2021/0297215 | A1* | 9/2021 | Da ........................ | H04W 4/029 |

FOREIGN PATENT DOCUMENTS

WO WO-2019114710 A1 * 6/2019 ........... H04L 5/0048

* cited by examiner

*Primary Examiner* — Muthuswamy G Manoharan
(74) *Attorney, Agent, or Firm* — Invenstone Patent, LLC

(57) ABSTRACT

Provided are a method and an apparatus for performing positioning. The method of a user equipment (UE) may include: receiving configuration information about a positioning reference signal (PRS) including subcarrier spacing information to be applied when the PRS is transmitted in each cell; receiving the PRS from each cell based on the subcarrier spacing information; and measuring a reference signal time difference (RSTD) based on the received PRS.

15 Claims, 24 Drawing Sheets

FIG.14

*PRS-Info*

```
-- ASN1START

PRS-Info ::= SEQUENCE {
    prs-Bandwidth        ENUMERATED { n6, n15, n25, n50, n75, n100, ... },
    prs-ConfigurationIndex  INTEGER (0..4095),
    numDL-Frames         ENUMERATED {sf-1, sf-2, sf-4, sf-6, ..., sf-add-v1420},
    ....
    prs-MutingInfo-r9    CHOICE {
        po2-r9              BIT STRING (SIZE(2)),
        po4-r9              BIT STRING (SIZE(4)),
        po8-r9              BIT STRING (SIZE(8)),
        po16-r9             BIT STRING (SIZE(16)),
        ....
        po32-v1420          BIT STRING (SIZE(32)),
        po64-v1420          BIT STRING (SIZE(64)),
        po128-v1420         BIT STRING (SIZE(128)),
        po256-v1420         BIT STRING (SIZE(256)),
        po512-v1420         BIT STRING (SIZE(512)),
        po1024-v1420        BIT STRING (SIZE(1024))
    }                                                OPTIONAL,        -- Need OP
[[  prsID-r14               INTEGER (0..4095)        OPTIONAL,        -- Need ON
    add-numDL-Frames-r14    INTEGER (1..160)         OPTIONAL,   -- Cond sf-add
    prsOccGroupLen-r14      ENUMERATED {g2, g4, g8, g16, g32, g64, g128,... }
                                                     OPTIONAL,   -- Cond Occ-Grp
    prsHoppingInfo-r14  CHOICE {
        nb2-r14             INTEGER (0.. maxAvailNarrowBands-Minus1-r14),
        nb4-r14             SEQUENCE (SIZE (3))
                                OF INTEGER (0.. maxAvailNarrowBands-Minus1-r14)
    }                                                OPTIONAL        -- Cond PRS-FH
]]
} maxAvailNarrowBands-Minus1-r14   INTEGER ::= 15 -- Maximum number of narrowbands minus 1

-- ASN1STOP
```

FIG.18

OTDOA-NeighbourCellInfoList

```
-- ASN1START

OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement OTDOA-NeighbourCellInfoElement ::= SEQUENCE {
    physCellId              INTEGER (0..503),
    cellGlobalId            ECGI            OPTIONAL,    -- Need ON
    earfcn                  ARFCN-ValueEUTRA OPTIONAL,   -- Cond NotSameAsRef0
    cpLength                ENUMERATED {normal, extended, ...}
    prs-SCS                 ENUMERATED {s15, s30, s60, s120, s240}
                                            OPTIONAL,   -- Cond NotSameAsRef1
    prsInfo                 PRS-Info        OPTIONAL,   -- Cond NotSameAsRef2
    antennaPortConfig       ENUMERATED {ports-1-or-2, ports-4, ...}
                                            OPTIONAL,   -- Cond NotsameAsRef3
    slotNumberOffset        INTEGER (0..19) OPTIONAL,   -- Cond NotSameAsRef4
    prs-SubframeOffset      INTEGER (0..1279) OPTIONAL, -- Cond InterFreq
    expectedRSTD            INTEGER (0..16383),
    expectedRSTD-Uncertainty INTEGER (0..1023),
    ...,
    ...
} maxFreqLayers INTEGER ::= 3

-- ASN1STOP
```

FIG. 19

PRS-Info

```
-- ASN1START

PRS-Info ::= SEQUENCE {
    prs-Bandwidth          ENUMERATED { n6, n15, n25, n50, n75, n100, ... },
    prs-ConfigurationIndex INTEGER (0..4095),
    numDL-Frames           ENUMERATED {sf-1, sf-2, sf-4, sf-6, ..., sf-add-v1420},
    prs-SCS                ENUMERATED {s15, s30, s60, s120, s240}
    ....
    prs-MutingInfo-r9      CHOICE {
        po2-r9             BIT STRING (SIZE(2)),
        po4-r9             BIT STRING (SIZE(4)),
        po8-r9             BIT STRING (SIZE(8)),
        po16-r9            BIT STRING (SIZE(16)),
        ....
        po32-v1420         BIT STRING (SIZE(32)),
        po64-v1420         BIT STRING (SIZE(64)),
        po128-v1420        BIT STRING (SIZE(128)),
        po256-v1420        BIT STRING (SIZE(256)),
        po512-v1420        BIT STRING (SIZE(512)),
        po1024-v1420       BIT STRING (SIZE(1024))
    }                                                OPTIONAL,       -- Need OP
[[ prsID-r14               INTEGER (0..4095)         OPTIONAL,       -- Need ON
    add-numDL-Frames-r14   INTEGER (1..160)          OPTIONAL,       -- Cond sf-add
    prsOccGroupLen-r14     ENUMERATED {g2, g4, g8, g16, g32, g64, g128... }
                                                     OPTIONAL,       -- Cond Occ-Grp
    prsHoppingInfo-r14  CHOICE {
        nb2-r14            INTEGER (0.. maxAvailNarrowBands-Minus1-r14),
        nb4-r14            SEQUENCE (SIZE (3))
                               OF INTEGER (0.. maxAvailNarrowBands-Minus1-r14)
    }                                                OPTIONAL        -- Cond PRS-FH
]]
}
maxAvailNarrowBands-Minus1-r14    INTEGER ::= 15    -- Maximum number of narrowbands minus 1
-- ASN1STOP
```

FIG.20

```
OTDOA-NeighbourCellInfoElement ::= SEQUENCE {
    physCellId              INTEGER (0..503),
    cellGlobalId            ECGI                OPTIONAL,    -- Need ON
    earfcn                  ARFCN-ValueEUTRA    OPTIONAL,    -- Cond NotSameAsRef0
    cpLength                ENUMERATED {normal, extended, ...}
                                                OPTIONAL,    -- Cond NotSameAsRef1
    prsinfo1                PRS-Info            OPTIONAL,    -- Cond NotSameAsRef2
    prsinfo2                PRS-Info            OPTIONAL,    -- Cond NotSameAsRef2

OTDOA-NeighbourCellInfoList

```
-- ASN1START

OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement OTDOA-NeighbourCellInfoElement ::= SEQUENCE {
    physCellId              INTEGER (0..503),
    cellGlobalId            ECGI                    OPTIONAL,     -- Need ON
    earfcn                  ARFCN-ValueEUTRA        OPTIONAL,     -- Cond NotSameAsRef0
    cpLength                ENUMERATED {normal, extended, ...}
                                                    OPTIONAL,     -- Cond NotSameAsRef1
    prsInfo                 PRS-Info                OPTIONAL,     -- Cond NotSameAsRef2
    antennaPortConfig       ENUMERATED {ports-1-or-2, ports-4, ...}
                                                    OPTIONAL,     -- Cond NotsameAsRef3
    slotNumberOffset        INTEGER (0..19)         OPTIONAL,     -- Cond NotSameAsRef4
    prs-SubframeOffset      INTEGER (0..1279)       OPTIONAL,     -- Cond InterFreq
    expectedRSTD            INTEGER (0..16383),
    expectedRSTD-Uncertainty INTEGER (0..1023),
    ....
-- ASN1STOP
```

APPARATUS AND METHOD FOR PERFORMING POSITIONING

CROSS REFERENCE TO RELATED APPLICATION

This application claims priority from Korean Patent Application Nos. 10-2019-0097764 & 10-2020-0062303, filed on Aug. 9, 2019 & May 25, 2020, which is hereby incorporated by reference for all purposes as if fully set forth herein.

BACKGROUND OF THE INVENTION

1. Field of the Invention

The present disclosure relates to a method and an apparatus for measuring the position of a UE in a next-generation radio access network (hereinafter, "new radio (NR)").

2. Description of the Prior Art

Recently, the 3rd generation partnership project (3GPP) has approved the "Study on New Radio Access Technology", which is a study item for research on next-generation/ 5G radio access technology (hereinafter, referred to as "new radio" or "NR"). Based on the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from other (e.g., subcarrier spacing, subframe, Transmission Time Interval (TTI), etc.) as a method for efficiently satisfying each usage scenario requirement through a frequency band constituting any NR system.

Particularly, it is necessary to develop a flexible design for a multiple numerology-based positioning method which is applicable to various use cases related to positioning of a UE in multiple numerologies, such as various subcarrier configurations, supported in NR.

SUMMARY OF THE INVENTION

An aspect of the present disclosure is to provide a method for perfoming positioning of a UE in multiple numerologies in a next-generation radio network.

In view of the foregoing aspect, one embodiment may provide a method of a user equipment (UE) for perfoming positioning. The method may include: receiving configuration information about a positioning reference signal (PRS) including subcarrier spacing information applied when the PRS is transmitted in each cell; receiving the PRS from each cell based on the subcarrier spacing information; and measuring a reference signal time difference (RSTD) based on the received PRS.

Further, one embodiment may provide a method of a base station for performing positioning. The method may include: transmitting configuration information about a positioning reference signal (PRS) including subcarrier spacing information applied when the PRS is transmitted in each cell; receiving information about a reference signal time difference (RSTD) measured by a UE according to the PRS transmitted based on the subcarrier spacing information; and estimating a position of the UE based on the received information about the RSTD.

In addition, one embodiment may provide a user equipment (UE) for performing positioning. The UE may include: a receiver configured to receive configuration information about a positioning reference signal (PRS) including subcarrier spacing information applied when the PRS is transmitted in each cell and to receive the PRS from each cell based on the subcarrier spacing information; a controller configured to measure a reference signal time difference (RSTD) based on the received PRS; and a transmitter configured to transmit information about the measured RSTD.

Furthermore, one embodiment may provide a base station for performing positioning. The base station may include: a transmitter configured to transmit configuration information about a positioning reference signal (PRS) including subcarrier spacing information applied when the PRS is transmitted in each cell; a receiver configured to receive information about a reference signal time difference (RSTD) measured by a UE according to the PRS transmitted based on the subcarrier spacing information; and a controller configured to estimate a position of the UE based on the received information about the RSTD.

According to the present disclosure, it is possible to provide a method for perfoming positioning of a UE in multiple numerologies in a next-generation radio network.

BRIEF DESCRIPTION OF THE DRAWINGS

The above and other aspects, features, and advantages of the present disclosure will be more apparent from the following detailed description taken in conjunction with the accompanying drawings, in which:

FIG. 14 is a view illustrating an example of an information element for providing information about the configuration of a positioning reference signal;

FIG. 18 is a view illustrating an example of OTDOA-NeighbourCellInfoList in accordance with an embodiment;

FIG. 19 is a view illustrating an example of an information element for providing information about the configuration of a positioning reference signal in accordance with an embodiment;

FIG. 20 is a view illustrating an example of the configuration of a positioning reference signal when configuring an OTDOA per cell in accordance with an embodiment;

FIG. 22 is a view illustrating another example of OTDOA-NeighbourCellInfoList in accordance with an embodiment;

DETAILED DESCRIPTION OF THE EXEMPLARY EMBODIMENTS

Figure 1:
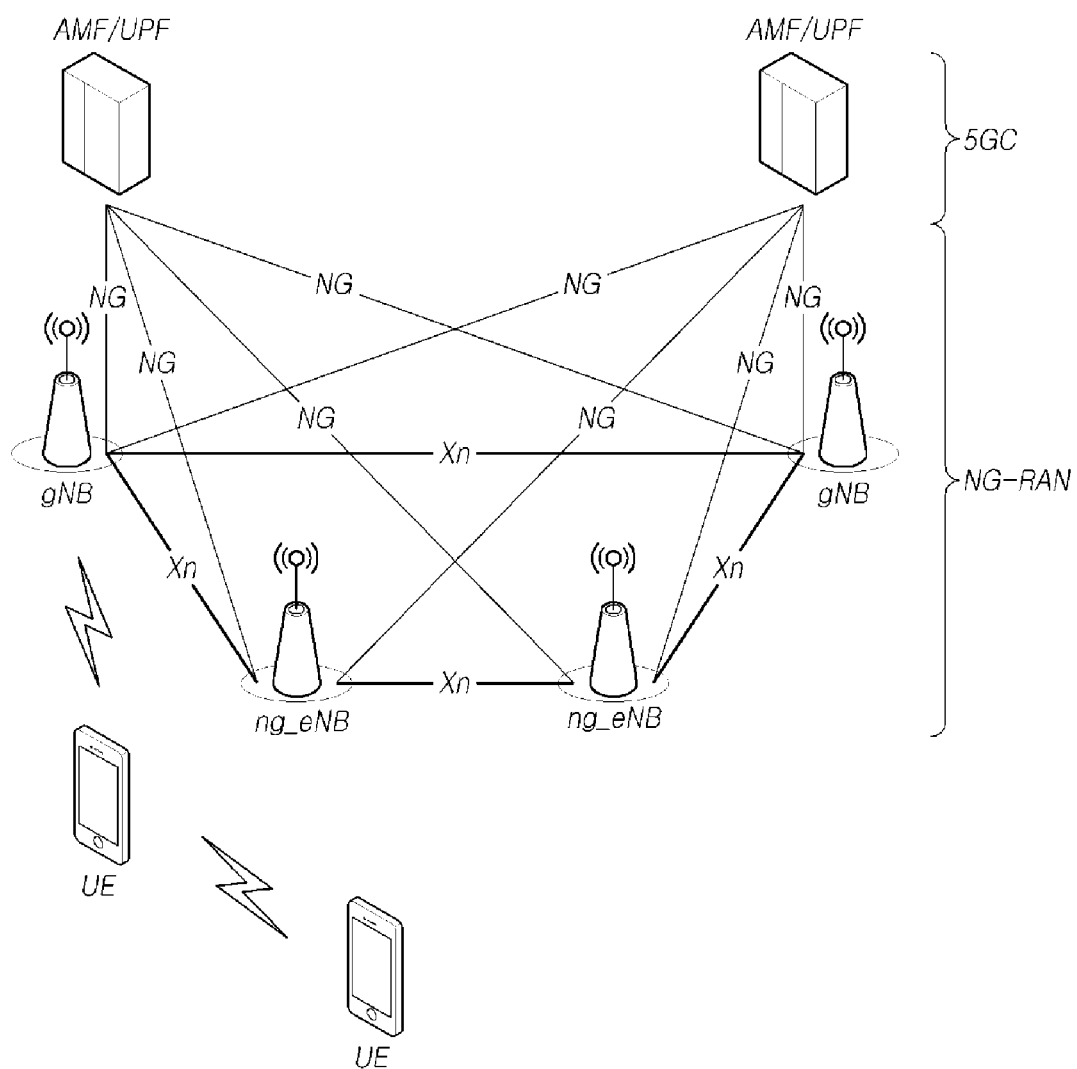
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described based on NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primal)/technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO)

scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined based on subcarrier spacing and a cyclic prefix (CP). As shown in Table 1 below, "μ" is used as an exponential value of 2 so as to be changed to exponentially based on 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
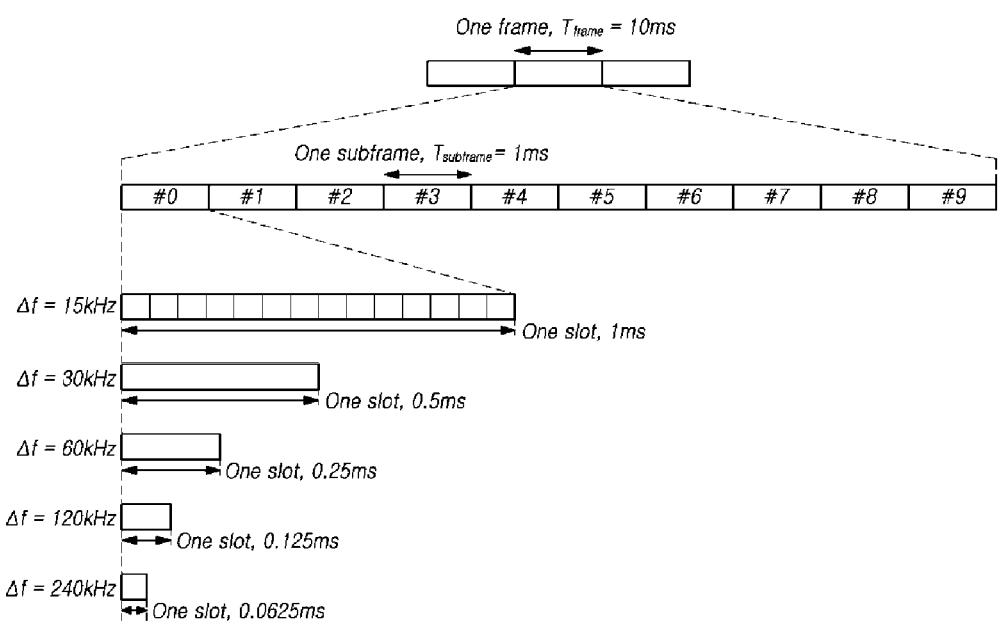
FIG. 2 is a view schematically illustrating a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
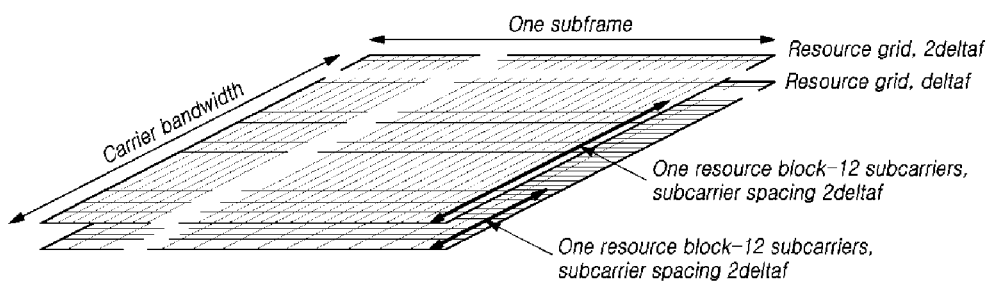
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
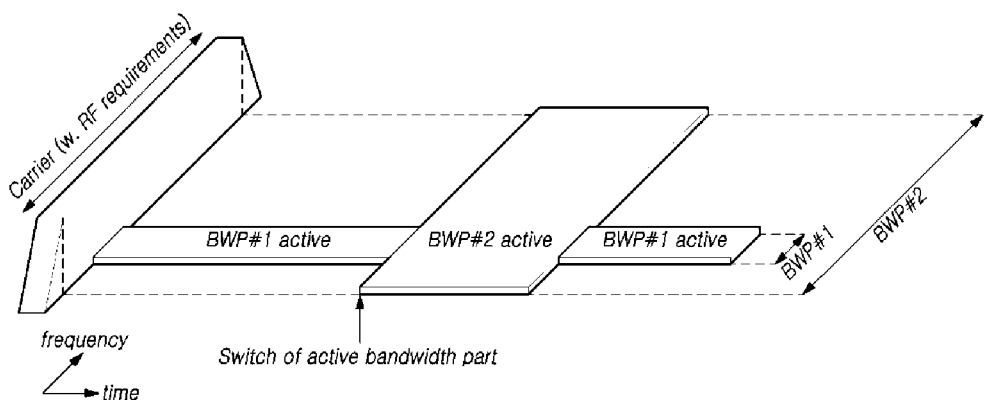
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
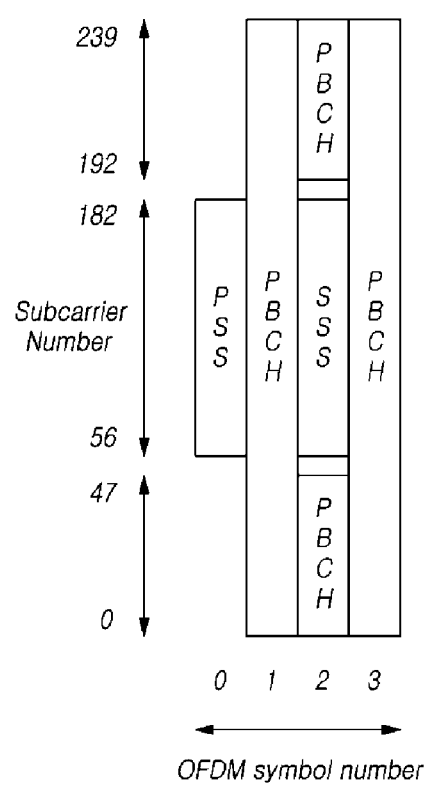
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
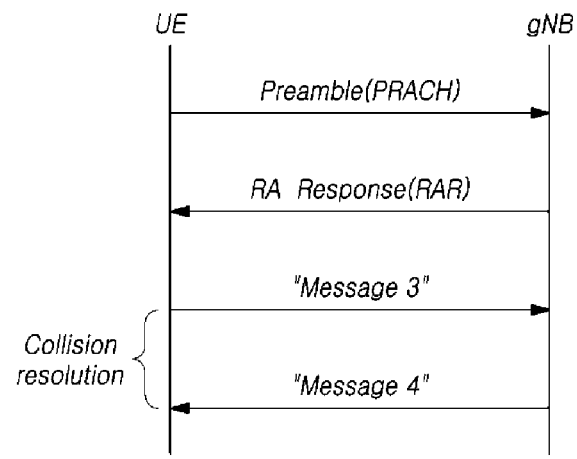
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/ downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
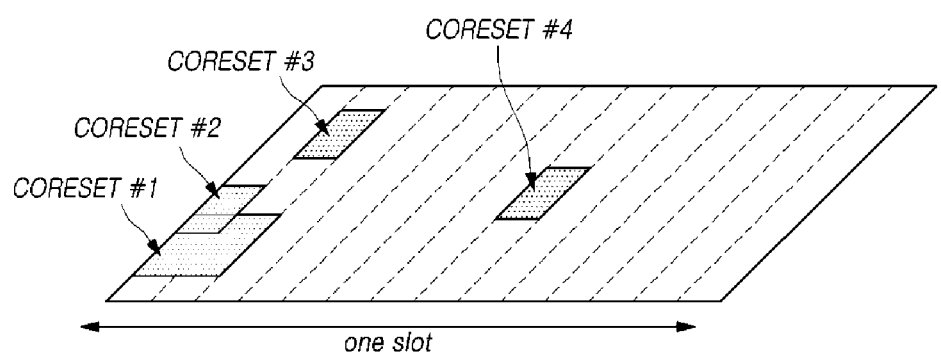
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

Recently, the 3GPP has approved the "Study on New Radio Access Technology", which is a study item for research on next-generation/5G radio access technology. Based on the Study on New Radio Access Technology, in RAN WG1, discussions have been in progress on frame structures, channel coding and modulation, waveforms, multiple access schemes, and the like for the NR It is required to design the NR not only to provide an improved data transmission rate, but also to meet various QoS requirements for each detailed and specific usage scenario, compared to the LTE/LTE-Advanced.

In particular, an enhanced mobile broadband (eMBB), massive machine-type communication (mMTC), and ultra reliable and low latency communication (URLLC) are defined as representative usage scenarios of the NR In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a subframe has been defined as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS). As a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, it may be difficult to satisfy latency requirements. To this end, a mini-slot may be defined to be made up of fewer OFDM symbols than the slot. Thus the scheduling for the latency critical data, such as the URLLC, may be performed based on the mini-slot.

Figure 8:
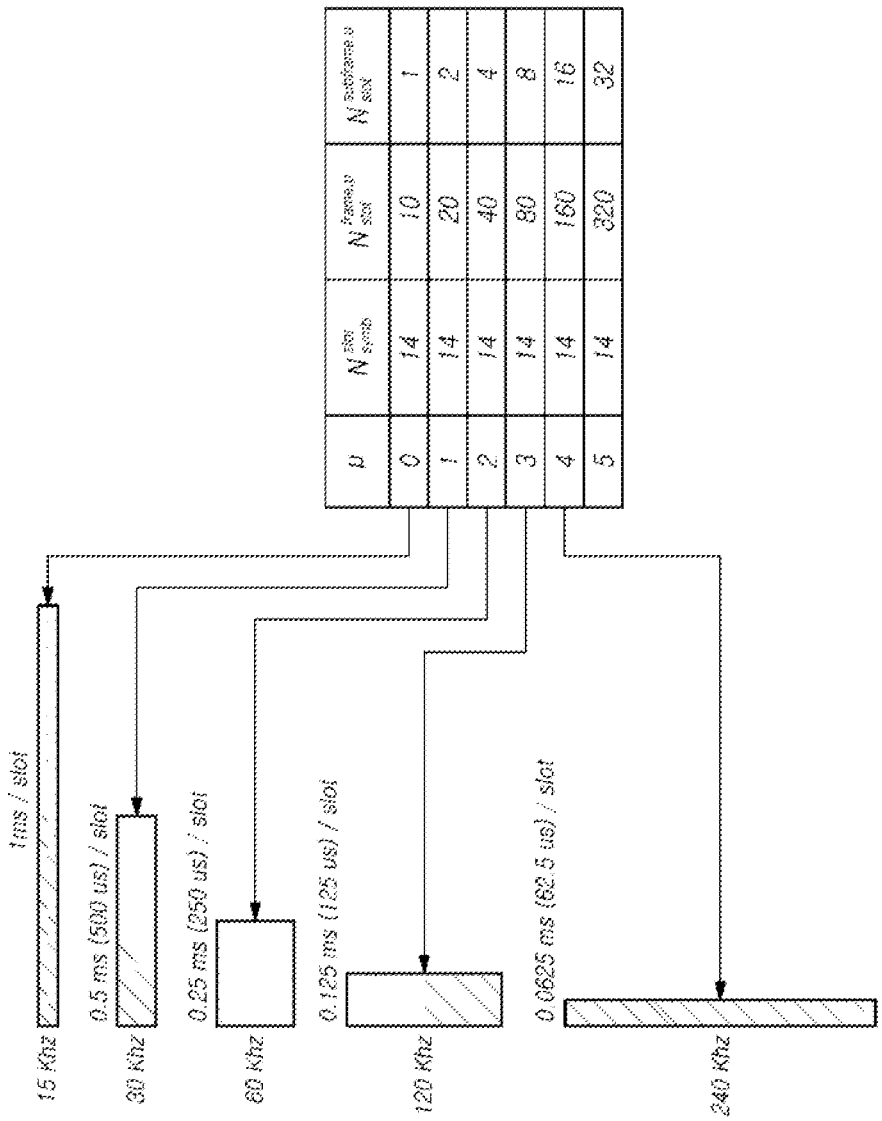
FIG. 8 is a view illustrating an example of symbol level alignment for different subcarrier spacings (SCSs)

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, because of different SCSs or different TTI lengths defined in the NR, related technologies have been developed for satisfying requirements of each of the URLLC and the eMBB.

Meanwhile, channel state information (CSI) provides a channel state for a network using a channel state indicator, instead of channel estimation using a typical cell-specific RE (reference signal) (CRS). It is cell-specific, but configured by RRC signaling of a UE. A definition of Channel State Information Reference Signal (CSI-RS) was introduced in LTE Release 10. The CSI-RS is used for allowing a UE to obtain channel state information by estimating demodulation reference signals.

Figure 9:
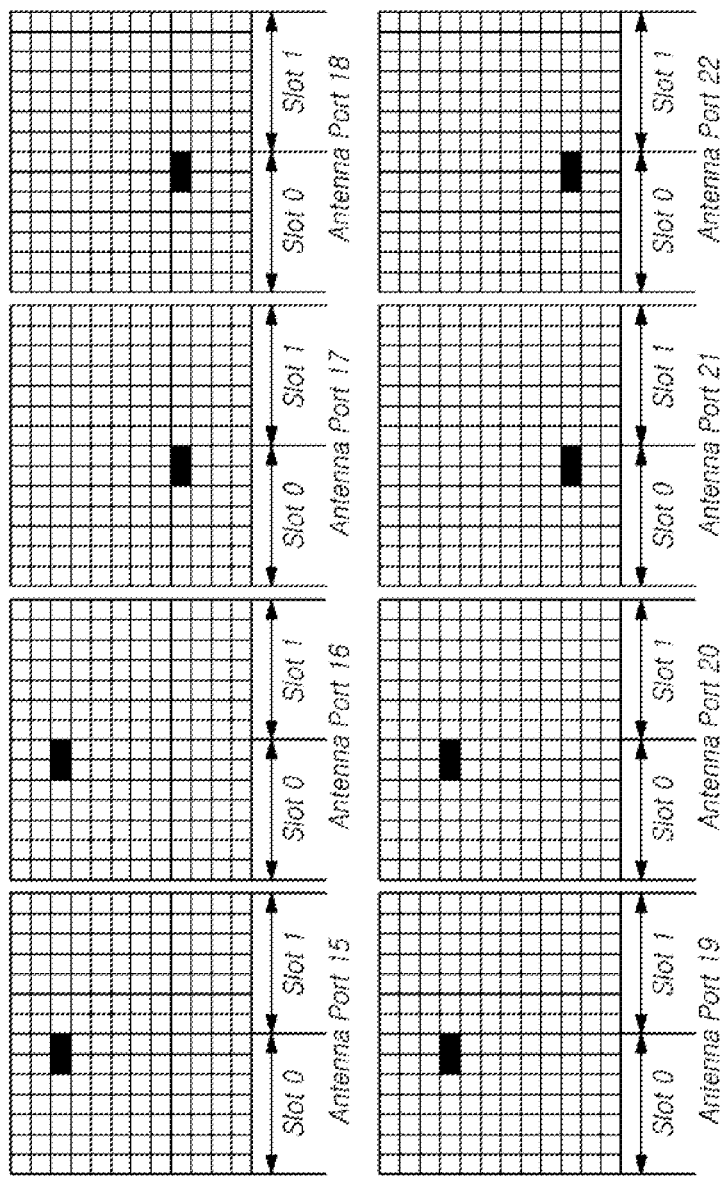
FIG. 9 is a view illustrating an LTE-A CSI-RS structure.

In LTE Rel-8/9, a cell is defined to support a maximum of 4 CRSs. As the LTE evolves from LTE Rel-8/9 to LTE-A (Rel-10), it has been necessary for the CSI to be extended for enabling a cell reference signal to support a maximum 8-layer transmission. Here, antenna ports of 15-22 are allocated as represented in FIG. 9, a transmission periodicity and mapping for resource allocation is determined through RRC configuration. Table 2 defines a mapping method through CSI-RS configuration for normal CP.

TABLE 2

Mapping front CSI reference signal configuration to (k', l') for normal cyclic

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

In the NR, the X-port CSI-RS has been finally defined as being allocated to N consecutive/non-consecutive OFDM symbols. Here, the X-ports are CSI-RS ports, where X is a maximum of 32. The CSI-RS is allocated over the N symbols, where N is a maximum of 4.

Figure 10:
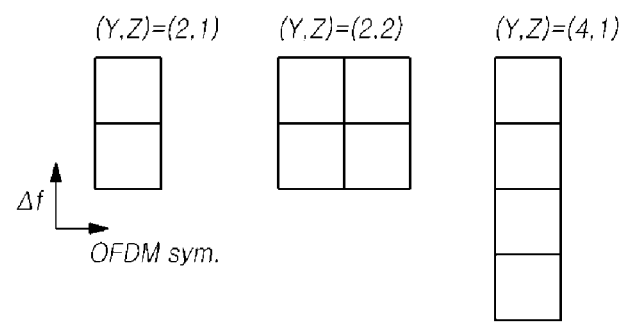
FIG. 10 is a view illustrating NR component CSI-RS RE patterns.

Basically, the CSI-RS has three component resource element (RE) patterns in total as illustrated in FIG. 10. Y and Z represent lengths on the time and frequency axes of CSI-RS RE patterns, respectively.

$(Y,Z) \in \{(2,1),(2,2),(4,1)\}$

Figure 11:
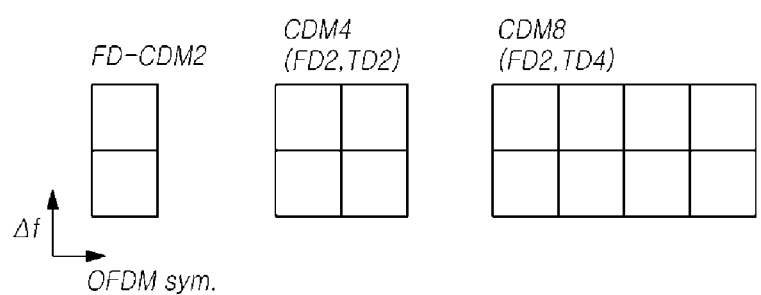
FIG. 11 is a view illustrating NR CDM patterns.

Further, three CDM patterns in total are supported in the NR as illustrated in FIG. 11.

FD-CDM2, CDM4(FD2,TD2), CDM8(FD2,TD4)

Here, following Tables 3 to 6 represent spreading sequences allocated to each CDM pattern in actual.

TABLE 3

The sequences $w_f(k')$ and $w_f(l')$ for CDMType equal to 'no CDM'

| Index | $w_f(k')$ | $w_f(l')$ |
|---|---|---|
| 0 | 1 | 1 |

TABLE 4

The sequences $w_f(k')$ and $w_f(l')$ for CDMType equal to 'FD-CDM2'

| Index | $w_f(k')$ | $w_f(l')$ |
|---|---|---|
| 0 | [+1 +1] | 1 |
| 1 | [+1 −1] | 1 |

TABLE 5

The sequences $w_f(k')$ and $w_f(l')$ for CDMType equal to 'CDM4'

| Index | $w_f(k')$ | $w_f(l')$ |
|---|---|---|
| 0 | [+1 +1] | [+1 +1] |
| 1 | [+1 −1] | [+1 +1] |
| 2 | [+1 +1] | [+1 −1] |
| 3 | [+1 −1] | [+1 −1] |

TABLE 6

The sequences $w_f(k')$ and $w_f(l')$ for CDMType equal to 'CDM8'

| Index | $w_f(k')$ | $w_f(l')$ |
|---|---|---|
| 0 | [+1 +1] | [+1 +1 +1 +1] |
| 1 | [+1 −1] | [+1 +1 +1 +1] |
| 2 | [+1 +1] | [+1 −1 +1 −1] |
| 3 | [+1 −1] | [+1 −1 +1 −1] |
| 4 | [+1 +1] | [+1 +1 −1 −1] |
| 5 | [+1 −1] | [+1 +1 −1 −1] |
| 6 | [+1 +1] | [+1 −1 −1 +1] |
| 7 | [+1 −1] | [+1 −1 −1 +1] |

LTE PRS

Figure 12:
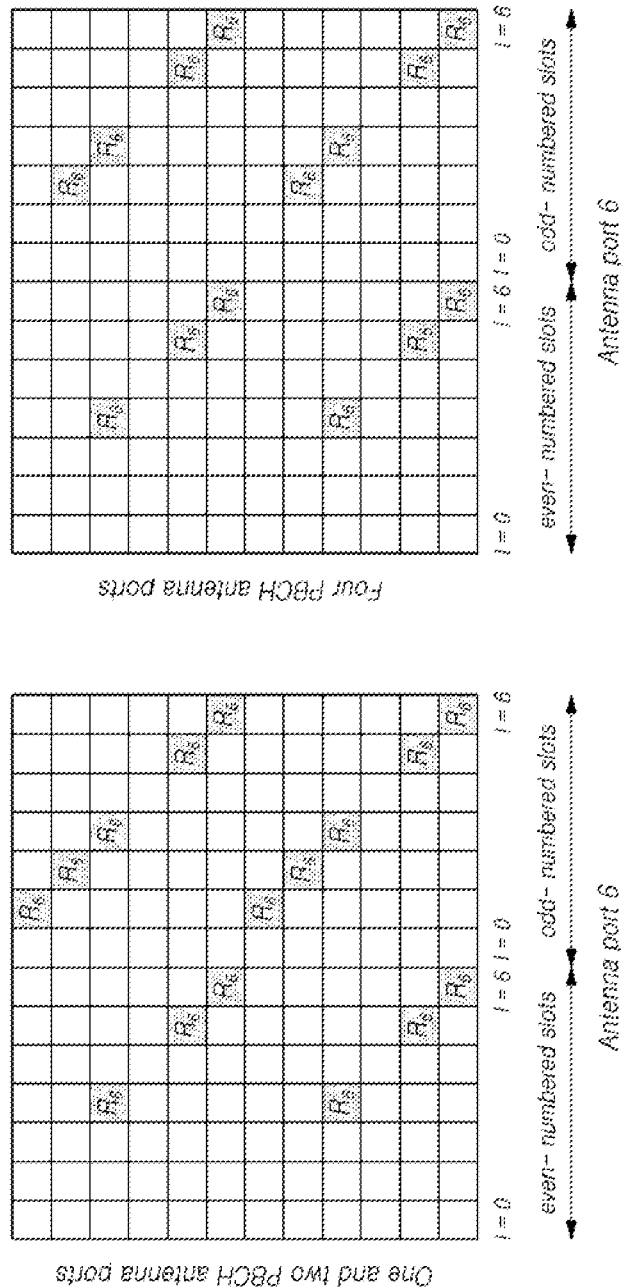
FIG. 12 is a view illustrating mapping of positioning reference signals in case of normal cyclic prefix.

In the LTE, higher-layer signaling may be transmitted via antenna port 6 as illustrated in FIG. 12. Through this, a UE performs position measurement. Basically, a PRS is transmitted to a pre-defined area through higher-layer signaling parameter configuration.

ΔPRS: subframe offset

TPRS: periodicity, 160, 320, 640, 1280 subframes

NPRS: duration (=No. of consecutive subframes), 1, 2, 4, 6 subframes

Basically, the Positioning Reference Signal (PRS) uses a pseudo random sequence, that is, a quasi-orthogonal characteristic sequence. That is, PRS sequences that overlap over code may be separated using this orthogonal characteristic. In frequency domain, as shown in FIG. 12, a total of 6 cells including 5 neighboring cells may be orthogonally allocated using frequency reuse factor=6. Here, a physical cell ID ("PCI") is basically used as an offset value for a frequency domain position of a PRS RE.

Finally, since a collision occurs in case all target cells configure an identical PRS transmission interval in the time domain, PRS transmission may be performed at an orthogonal time interval between specific cells or cell groups by configuring a muting interval per cell.

Figure 13:
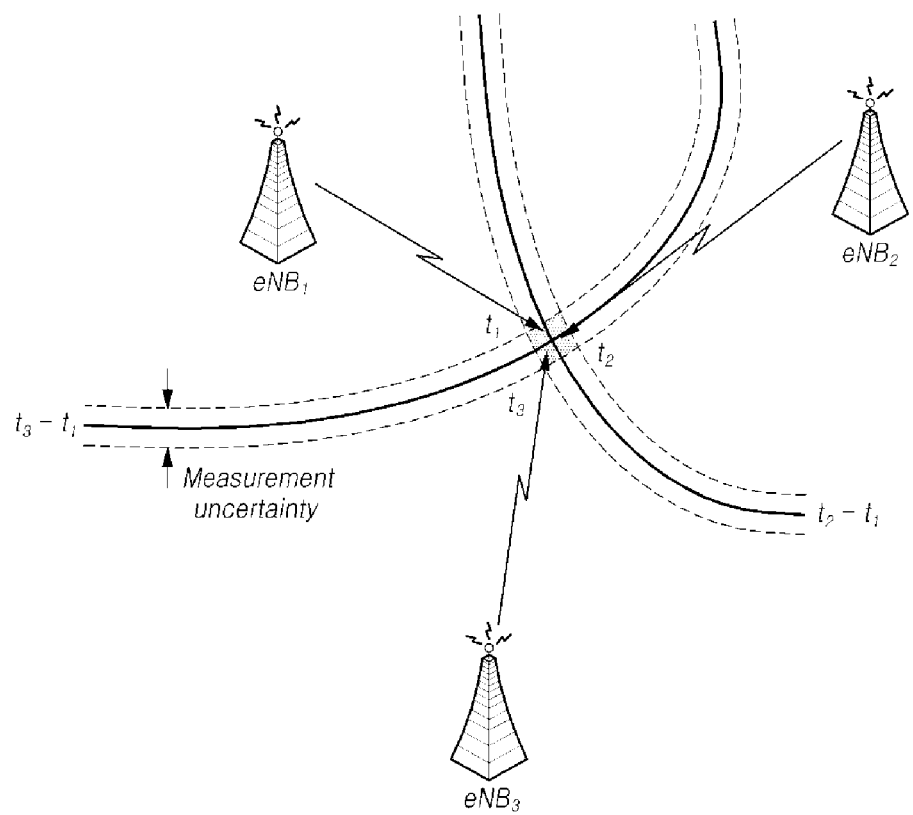
FIG. 13 is a view illustrating OTDOA-based positioning.

Observed Time Difference Of Arrival (OTDOA) is a representative technique of estimating a received signal time difference (RSTD), which is a difference in time between received signals as a basic principle for position measurement. Its basic principle is such that a position of a UE may be estimated by estimating an overlapping area based on time differences from at least 3 cells as shown in FIG. 13. For the PRS, PRS transmission information for a maximum of 24×3 (3-sectors) cells may be configured for a UE through higher-layer signaling.

Further, the UE is required to report RSTD values estimated for each cell to a corresponding base station. Following Table 7 represents values used for reporting time difference values estimated by the UE.

Basically, intervals from −15391Ts to 15391Ts are defined as a reporting range. Up to −4096 Ts RSTD≤4096≤Ts have 1 Ts resolution, and the remaining intervals have 5 Ts resolution.

TABLE 7

RSTD report mapping

| Reported Value | Measured Quantity Value | Unit |
|---|---|---|
| RSTD_0000 | −15391 > RSTD | $T_s$ |
| RSTD_0001 | −15391 ≤ RSTD < −15386 | $T_s$ |
| ... | ... | ... |
| RSTD_2258 | −4106 ≤ RSTD < −4101 | $T_s$ |
| RSTD_2259 | −4101 ≤ RSTD < −4096 | $T_s$ |
| RSTD_2260 | −4096 ≤ RSTD < −4095 | $T_s$ |
| RSTD_2261 | −4095 ≤ RSTD < −4094 | $T_s$ |
| ... | ... | ... |
| RSTD_6353 | −3 ≤ RSTD < −2 | $T_s$ |
| RSTD_6354 | −2 ≤ RSTD < −1 | $T_s$ |
| RSTD_6355 | −1 ≤ RSTD ≤ 0 | $T_s$ |
| RSTD_6356 | 0 < RSTD ≤ 1 | $T_s$ |
| RSTD_6357 | 1 < RSTD ≤ 2 | $T_s$ |
| RSTD_6358 | 2 < RSTD ≤ 3 | $T_s$ |
| ... | ... | ... |
| RSTD_10450 | 4094 < RSTD ≤ 4095 | $T_s$ |
| RSTD_10451 | 4095 < RSTD ≤ 4096 | $T_s$ |
| RSTD_10452 | 4096 < RSTD ≤ 4101 | $T_s$ |
| RSTD_10453 | 4101 < RSTD ≤ 4106 | $T_s$ |
| ... | ... | ... |
| RSTD_12709 | 15381 < RSTD ≤ 15386 | $T_s$ |
| RSTD_12710 | 15386 < RSTD ≤ 15391 | $T_s$ |
| RSTD_12711 | 15391 < RSTD | $T_s$ |

Additionally, reporting for high resolution is also included in the corresponding standard as in Table 7. These values may be transmitted along with previously estimated RSTD, and reporting using RSTD_delta_0, RSTD_delta_1 is available in −2260 Ts≤RSTD≤10451 Ts, while reporting using all values except for RSTD_delta_1 is available in the intervals of 0000Ts≤RSTD≤2259 Ts and 10452 Ts≤RSTD≤12711 Ts. Here, 1 Ts is about 9.8 m. The following is a method of calculating based on 15 kHz that is the subcarrier-spacing of the LTE.

SCS=15 kHz, a reference OFDM symbol length=66.7 us 2048 samples are generated on the time axis based on 2048 FFT (oversampling not applied)

a length per sample on the time axis (=1Ts)=66.7 us/2048 samples in time*(3*108 m/s)=9.8 m

TABLE 8

Relative quantity mapping for higher-resolution RSTD measurement reporting

| Reported Relative Qkuantity Value | Measured Relative Quantity Value, $\Delta_{RSTD}$ | Unit |
|---|---|---|
| RSTD_delta_0 | 0 | $T_s$ |
| RSTD_delta_1 | 0.5 | $T_s$ |
| RSTD_delta_2 | 1.0 | $T_s$ |
| RSTD_delta_3 | 2.0 | $T_s$ |
| RSTD_delta_4 | 3.0 | $T_s$ |
| RSTD_delta_5 | 4.0 | $T_s$ |

LTE PRS Muting

A PRS is transmitted with constant power set in an individual positioning occasion. However, transmission power at a specific time when a PRS is transmitted may be set to zero power, which is defined as PRS muting. For example, when a serving gNB is muted and a UE receives a PRS, a PRS transmitted from a neighboring gNB is more likely to be accurately detected by the UE.

A PRS muting configuration is defined by a periodic muting sequence, and a period $T_{REP}$ may have a value of 2, 4, 8, 16, . . . , or 1024 in positioning occasions. As illustrated in FIG. 14, PRS muting has a length 2, 4, 8, 16, . . . , or 1024 bits, and the sequence includes 0s and 1s. When PRS muting information is set to '0', a PRS is muted in a corresponding PRS positioning occasion. A first bit of the PRS muting sequence is applied from a first PRS positioning occasion after a time point when the system frame number (SFN) of a reference cell is 0.

Basically, a muting pattern may be applied within a period of $T_{REP} \times T_{PRS} > 10240$ subframes. Here, $T_{PRS}$ denotes the transmission period of a PRS. When the period exceeds 10240 subframe, only first n bits are applied.

Figure 15:
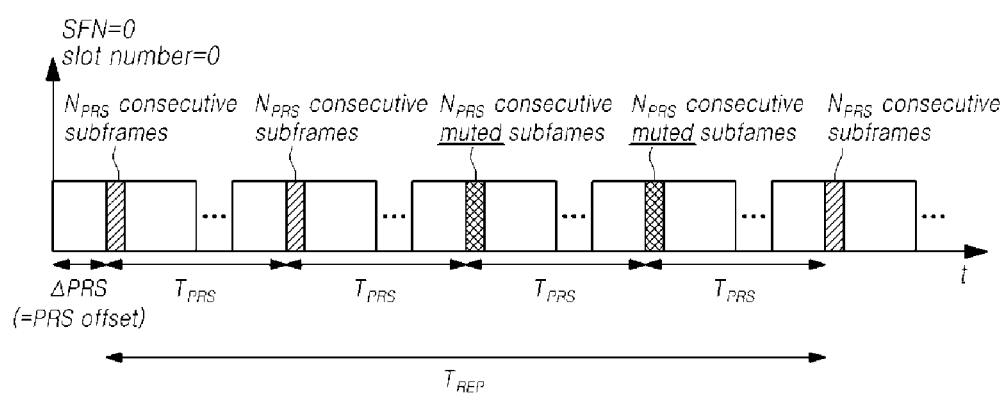
FIG. 15 is a view illustrating an example of positioning reference signal muting.

FIG. 15 illustrates an example of a PRS muting pattern with $T_{REP}$ of four positioning occasions. Here, an applied PRS muting bit string, that is, muting sequence, is '1100', and an x-patterned part indicates a PRS muting region, that is, an interval in which a PRS is not transmitted.

Currently, there is no method for configuring a PRS observed time difference of arrival (OTDOA) based on multiple numerologies for an NR PRS. The present disclosure proposes a method for configuring a downlink PRS OTDOA based on numerology for 5G NR Currently, NR supports multiple numerologies supporting various subcarrier configurations. An NR PRS is highly likely to inherit multiple numerologies of NR subsequently, and a method for configuring an OTDOA in view of this feature is needed. The present disclosure also proposes an OTDOA feedback method based on multiple numerologies and a method for synchronizing a reference cell and a neighboring cell.

Hereinafter, a method for performing positioning on a UE in multiple numerologies according to an embodiment will be described with reference to relevant drawings.

Figure 16:
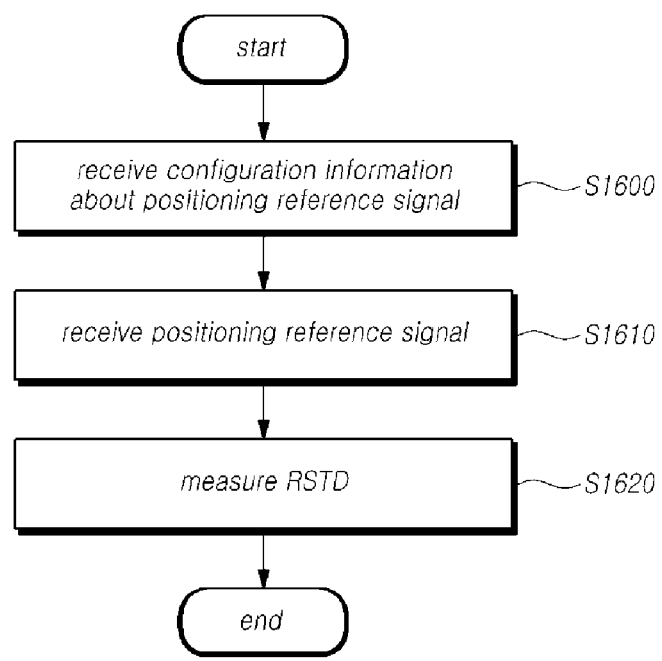
FIG. 16 is a view illustrating a procedure of a UE for performing positioning in accordance with an embodiment.

FIG. 16 is a view illustrating a procedure of a UE for performing positioning in accordance with an embodiment.

Referring to FIG. 16, the UE may receive configuration information about a PRS including subcarrier spacing information applied when a PRS is transmitted in each cell (S1600).

The UE may detect a PRS for OTDOA-based position estimation. To this end, the UE may receive the configuration information about the PRS from a base station or a location server.

According to an example, the configuration information about the PRS may include configuration information about a PRS resource used for reception of the PRS. The PRS resource is a radio resource used to transmit the PRS for positioning of the UE, and the PRS resource may be flexibly configured to meet various usage scenarios of NR.

For example, the configuration information about the PRS resource may be received from the base station through higher-layer signaling. That is, parameters for configuring the PRS resource may be set as higher-layer parameters. The configuration information about the PRS resource may include a PRS identifier, a PRS sequence, frequency-domain allocation information, time-domain allocation information, and comb size information about at least one PRS resource.

At least one PRS resource may be configured to be used by the base station to transmit the PRS. For example, the at least one PRS resource may be configured as a PRS resource set. Further, at least one PRS resource set may be configured to be used to transmit the PRS. In this case, in order to identify each PRS resource and the PRS resource set, an identifier (ID) may be assigned to each PRS resource and the PRS resource set. In addition, the number of PRS resources included in each PRS resource set may be included in the configuration information about the PRS resource. The PRS resource set may be configured to be individually matched to each beam by multiplexing.

PRS sequence information may be information used to map the PRS to the PRS resource. For example, a PRS sequence may be a pseudo-random sequence, that is, a quasi-orthogonal sequence. That is, PRS sequences overlapping on a code may be separated using orthogonality. In addition, the configuration information about the PRS resource may include a PRS sequence ID for identifying a PRS sequence used for mapping of the PRS.

The configuration information about the PRS resource may include time-domain allocation information about the PRS resource. The time-domain allocation information may include information about the index of a symbol at which the PRS starts in the PRS resource and the size of N consecutive symbols in which the PRS is configured.

To this end, the configuration information may include offset information about a slot in which the PRS resource starts with respect to an initial slot in an initial subframe with a subframe number 0 (SFN0) included in one period of a radio frame configured for a serving cell of the UE. In addition, the configuration information may include information about a start symbol in which the PRS starts to be transmitted in the slot in which the PRS resource starts. For example, in a case of a normal CP, the start symbol may be set to any one of 14 symbols included in one slot. That is, any one of symbols 0 to 13 may be set as the start symbol.

The PRS may be mapped to N consecutive symbols in one slot included in the PRS resource. For example, N (the number of consecutive symbols) may be set to any one of 2, 4, 6, and 12. For example, when the start symbol is symbol 2 and N is set to 2, the PRS may be transmitted on symbols 2 and 3 in the slot.

The configuration information about the PRS resource may include frequency-domain allocation information about the PRS resource. The frequency-domain allocation information may include information about the index of a physical resource block (PRB) in which the PRS resource starts with in a system bandwidth configured for the UE and the number of resource blocks allocated for the PRS resource.

To this end, the configuration information may include offset information about a subcarrier in which the PRS resource starts with respect to a subcarrier having the lowest index among subcarriers included in a frequency band allocated for reception of the PRS in a system bandwidth configured for the serving cell of the UE.

Further, the configuration information about the PRS resource may include comb size information. The comb size information is information about a pattern in a frequency domain in which the PRS is configured for a symbol in the PRS resource. For example, when 12 resource elements (REs) are allocated for transmission of the PRS for one slot, a comb size may be set to any one of 2, 4, 6, and 12. For example, when the comb size is set to 2, the PRS may be configured individually over two subcarriers for each symbol.

For example, the PRS may be periodically and repeatedly transmitted. In this case, the configuration information about the PRS resource may include period information about a PRS resource set. The period information may be set based on a subcarrier spacing value. For example, the period information may be set to any value of $2\mu*\{4, 8, 16, 32, 64, 5, 10, 20, 40, 80, 160, 320, 640, 1280, 2560, 5120, 10240, 20480\}$ slots.

The configuration information about the PRS resource may further include information about the number of repetitions of the PRS resource in one PRS resource set. In this case, an offset value between repeated PRS resources may also be included in the configuration information.

In NR, various numerologies may be supported, and accordingly subcarrier spacing (SCS) may be variously set, such as 15, 30, and 60 kHz. In this case, the UE may perform OTDOA only on cells having the same SCS value and may also perform OTDOA on neighboring cells having a different SCS value from that of the serving cell.

To this end, the UE may receive the configuration information about the PRS including the subcarrier spacing information for each cell receiving the PRS from the base station or the location server. Here, each cell may include the serving cell, neighboring cells, and a reference cell. For example, in the subcarrier spacing information for each cell, subcarrier spacing for each cell may be set to any one value of 15, 30, 60, or 120 kHz.

Referring back to FIG. 16, the UE may receive a PRS from each cell based on the subcarrier spacing information (S1610) and may measure a reference signal time difference (RSTD) based on the received PRS (S1620).

The UE may receive a PRS by monitoring a PRS resource configured for each cell according to the configuration information about the PRS resource. For example, in order to measure the position of the UE, the UE may receive a PRS from each of the serving cell and at least two neighboring cells.

When a different subcarrier spacing value is applied to each cell receiving the PRS, time for one slot is changed according to each subcarrier spacing value. Thus, it is necessary to determine an RSTD measurement criterion. That is, the transmission timings of the PRSs of the respective cells need to be arranged according to a criterion. To this end, the UE may receive reference information as an RSTD measurement criterion from the base station.

For example, the reference information may include subcarrier spacing information and system frame number (SFN) information about transmission of a PRS. In the subcarrier spacing information included in the reference information, subcarrier spacing may be set to any one value of 15, 30, 60, or 120 kHz, and slot offset information may be set for each subcarrier spacing value.

That is, the UE may receive subcarrier spacing information applied to transmission of a PRS in the reference cell and information about an SFN at which the transmission of the PRS starts. In addition, the UE may receive subcarrier spacing information applied to transmission of a PRS from each different cell receiving the PRS and information about an SFN at which the transmission of the PRS starts.

The UE may measure an RSTD for a PRS received from each cell based on the subcarrier spacing information about transmission of the PRS, the slot offset information for the subcarrier spacing value, and the SFN information included in the reference information. That is, when the reference cell and the serving cell have different numerologies, an offset value interpreted based on the reference cell and an offset value interpreted based on the serving cell are different. Thus, it may be configured to interpret an offset value based on the reference cell.

The UE may report measured RSTD information to the base station. In this case, the UE may also report the PRS resource ID of a PRS resource for receiving a PRS used to measure the reported information and the ID of a PRS resource set including the PRS resource.

The base station or the location server may estimate an intersection area based on the received RSTD information. Accordingly, the position of the UE may be estimated.

While horizontal positioning of the UE has been described above, a transmission pattern of a PRS for vertical positioning of the UE may also be configured in order to measure the vertical position of the UE according to an embodiment. The transmission pattern of the PRS may be set based on beamforming. In positioning of the UE based on beamforming, a horizontal beam and a vertical beam may be applied separately. The UE may report at least one of horizontal beam information or vertical beam information configured for reception of the PRS along with RSTD information to the base station.

For example, the horizontal beam information may include a horizontal beam index, a horizontal angle of arrival (AoA), and arrival time information. The vertical beam information may include a vertical beam index, a vertical AoA, and arrival time information. The base station may determine the position of the UE based on an AoA and arrival time information of a beam corresponding to a beam index.

For example, vertical beamforming may be applied to a transmission pattern of a PRS set by higher-layer signaling. That is, different vertical beams may be applied to respective symbols in a slot allocated for transmission of the PRS. To this end, configuration information about the PRS by higher-layer signaling may further include information on whether a vertical beam is configured.

The UE may report the beam index of a vertical beam applied to reception of the PRS along with RSTD information to the base station. For example, the UE may be configured to report the beam index of the vertical beam applied to the reception of the PRS among beam indexes preset for vertical beams.

As another example, the UE may be configured to report the index of a symbol having the highest reception quality for the PRS. As described above, since different vertical beams are configured per symbol, the base station may identify a corresponding vertical beam based on the index of the symbol and may implicitly estimate the vertical direction of the UE.

According to an embodiment, a transmission period for a vertical PRS (beamformed PRS) based on beamforming for vertical positioning may be configured separately from that for a horizontal PRS for horizontal positioning described above. For example, a transmission pattern of the vertical PRS may be set with respect to some symbols in the same slot. As another example, the horizontal PRS and the vertical PRS may be set in different slots.

Accordingly, the higher-layer signaling indicating the configuration information about the PRS may include a higher-layer parameter that provides a bitmap indicating the positions of the horizontal PRS and the vertical PRS in a slot.

In this manner, it is possible to provide a downlink PRS OTDOA configuration method for perfoming positioning of a UE in multiple numerologies in a next-generation radio network.

Figure 17:
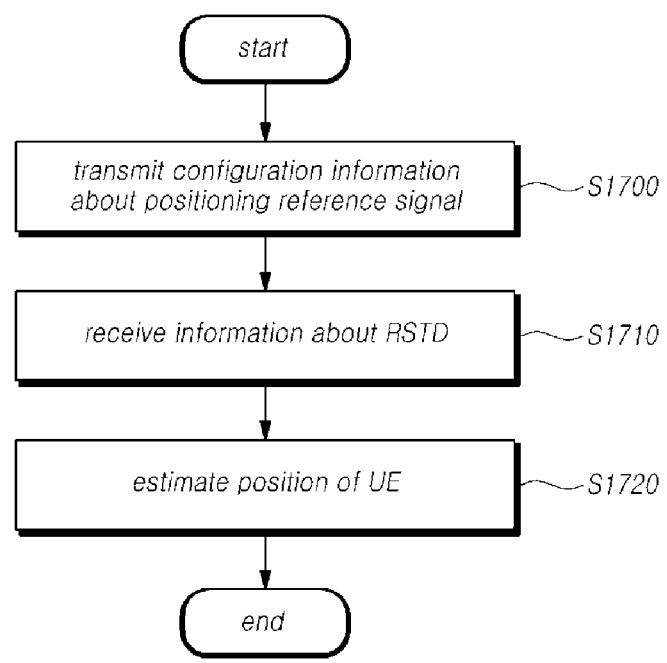
FIG. 17 is a view illustrating a procedure of a base station for performing positioning in accordance with an embodiment.

FIG. 17 is a view illustrating a procedure of a base station for performing positioning in accordance with an embodiment.

Referring to FIG. 17, the base station may transmit configuration information about a PRS including subcarrier spacing information to be applied when a PRS is transmitted in each cell (S1700).

A UE may detect a PRS for OTDOA-based position estimation. To this end, the base station may transmit the configuration information about the PRS to the UE.

In NR, various numerologies may be supported. Accordingly, subcarrier spacing (SCS) may be variously set, such as 15, 30, and 60 kHz. In this case, the UE may perform OTDOA only on cells having the same SCS value and may also perform OTDOA on neighboring cells having a different SCS value from that of the serving cell.

Accordingly, the base station may transmit the configuration information about the PRS including the subcarrier spacing information for each cell receiving the PRS to the UE. Here, each cell may include the serving cell, neighboring cells, and a reference cell. For example, in the subcarrier spacing information for each cell, subcarrier spacing for each cell may be set to any one value of 15, 30, 60, or 120 kHz.

Referring back to FIG. 17, the base station may receive information about an RSTD measured by the UE according to the PRS transmitted based on the subcarrier spacing information (S1710) and may estimate the position of the UE based on the received information about the RSTD (S1720).

The base station may transmit a PRS using a PRS resource configured for each cell according to the configuration information about the PRS resource. For example, in order to measure the position of the UE, the base station may transmit a PRS from each of the serving cell and at least two neighboring cells to the UE.

When a different subcarrier spacing value is applied to each cell receiving the PRS, time for one slot is changed according to each subcarrier spacing value. Thus, it is necessary to determine an RSTD measurement criterion. That is, the transmission timings of the PRSs of the respective cells need to be arranged according to a criterion. To this end, the base station may transmit reference information as an RSTD measurement criterion to the UE.

For example, the reference information may include subcarrier spacing information and SFN information about transmission of a PRS. In the subcarrier spacing information included in the reference information, subcarrier spacing may be set to any one value of 15, 30, 60, or 120 kHz, and slot offset information may be set for each subcarrier spacing value.

That is, the base station may transmit subcarrier spacing information applied to transmission of a PRS in the reference cell and information about an SFN at which the transmission of the PRS starts. In addition, the base station may transmit subcarrier spacing information to be applied to transmission of a PRS from each different cell receiving the PRS and information about an SFN at which the transmission of the PRS starts.

The UE may measure an RSTD for a PRS received from each cell based on the subcarrier spacing information about transmission of the PRS, the slot offset information for the subcarrier spacing value, and the SFN information included in the reference information. That is, when the reference cell and the serving cell have different numerologies, an offset value interpreted based on the reference cell and an offset value interpreted based on the serving cell are different. Thus, it may be configured to interpret an offset value based on the reference cell.

The base station may receive measured RSTD information from the UE. In this case, the UE may also report the PRS resource ID of a PRS resource for receiving a PRS used to measure the reported information and the ID of a PRS resource set including the PRS resource.

The base station may estimate an intersection area based on the RSTD information. Accordingly, the position of the UE may be estimated.

In this manner, it is possible to provide a downlink PRS OTDOA configuration method for performing positioning of a UE in multiple numerologies in a next-generation radio network.

Hereinafter, each one of embodiments for performing positioning on a UE in multiple numerologies will be described with reference to relevant drawings.

Regarding NR positioning, Positioning Use Case and Accuracy in TR 22.862 is referred to for mainly proposed use cases, which is briefly summarized below in Table 9.

TABLE 9

SMARTER Use Cases and Potential Positioning Requirements

| Use case | Accuracy |
|---|---|
| Higher accuracy positioning outdoor with high speed moving | <1 m Up to 200 km/h |
| Higher accuracy positioning with low speed moving (including indoor and outdoor) | <1 m Indoor and Outdoor |
| Higher accuracy positioning for low attitude UAV in critical condition (e.g. Drones) | Remote control(Outdoor): 0.5 m Horizontal0.3 m Vertical Data analysis(Outdoor): 0.1 m Horizontal0.1 m Vertical |
| Higher accuracy positioning for mIoT | Wearables(Outdoor/Indoor): 2 m Horizontal Patient location (in Hospital): 3 m Horizontal Patient location (out Hospital): 200 m Horizontal |

According to briefly summarized NR requirements, it is necessary to provide a higher resolution than in LTE and to support a variety of use cases. In addition, 3D positioning is required in some scenarios. Therefore, in addition to existing OTDOA-based time difference, it is necessary to further provide information about a vertical or horizontal direction. Moreover, it is necessary to provide single cell-based positioning information based on a signal strength value and beam information.

The present disclosure proposes configuration methods for accurately performing OTDOA detection of an NR PRS according to the aforementioned various use cases.

Embodiment 1: Numerology Information about Each Cell is Included in OTDOA Configuration Information when the OTDOA Configuration Information is Generated Fundamentally, in a downlink, detection of a PRS based on OTDOA is performed. In an existing LTE PRS, since subcarrier spacing (SCS) is always equally 15 kHz, it is not necessary to transmit information about an SCS value set for each cell to a UE.

However, since NR is configured to support a variety of numerologies, SCS may be set to 15, 30, or 60 kHz in a band of FR1 (<7 GHz). In the present disclosure, it is assumed that a UE may perform an OTDOA with only cells always having the same SCS value, but a neighboring cell having a different SCS value from that of a serving cell can also estimate an OTDOA.

Accordingly, an information element transmitted from a location server to the UE may include SCS information about each cell. Here, each cell may be a serving cell, a neighboring cell, or a reference cell. For example, as described based on LTE-based OTDOA cell information, as illustrated in FIG. 18, numerology information is added. That is, an information field indicating PRS subcarrier spacing information, such as prs-SCS, may be added. For example, although the SCS is shown to include 15, 30, 60, 120, and 240 kHz, an SCS set included in a corresponding category may be differently configured.

For example, the PRS subcarrier spacing information may be directly included in a prsInfo information field of each cell that basically includes the PRS subcarrier spacing information. Referring to an existing specification of LTE Positioning Protocol in TS 36.355, basic PRS configuration information of each cell follows a format illustrated in FIG. 19. Assuming that NR inherits a similar information field as it is, numerology information may be included in a PRS-Info information element as shown in FIG. 19.

Embodiment 2: A UE Additionally Includes Numerology or Table Index Information when Feeding Back an OTDOA Estimation Value According to the present disclosure, a new indication field may be added in an existing OTDOA-based feedback method. That is, as shown in Table 10, the added field may be fed back along with an existing cell ID and an RSTD as a measured OTDOA-based measurement value.

TABLE 10

| Cell ID | Reported Value | indication |
|---|---|---|
| 0 | RSTD_0000 | 00 |
| 1 | RSTD_0001 | 00 |
| 2 | RSTD_2258 | 01 |
| 3 | RSTD_2259 | 01 |
| 4 | RSTD_2259 | 10 |
| ... | ... | ... |

The added indication field may be defined for various purposes. As described above, the indication field may represent numerology information about a cell in which an RSTD is measured. When the SCS of a cell transmitting an initial downlink (DL) PRS has only two candidates of 15 and 30 kHz, the indication field may be defined as one bit. However, when 15, 30, 60, and 120 kHz are supported, the indication field may be defined as two bits as shown in Table 10.

In addition, the added indication field may be used for multiple table indications. For example, when a multiple reporting table is defined for a UE through a location server, the step size or the like of an RSTD may be differently defined, and a different reporting table may be used depending on the numerology of each cell. Thus, according to the present disclosure, a reporting table index used by the UE may be indicated in feedback, thereby providing accurate RSTD feedback to a gNB.

Embodiment 3: A Time-Domain Transmission Period Based on Multiple Numerologies May be Configured when an NR PRS is Transmitted In the present disclosure, it is possible to configure a PRS transmission period based on multiple numerologies. Multiple PRS transmissions may be configured for each cell, and each PRS configuration period may have different numerology.

For example, it is assumed that PRS configuration 1 and PRS configuration 2 may be set at the same time. Here, an information field defined in each PRS configuration may be configured differently as illustrated in FIG. 20. For example, as illustrated in FIG. 20, it is assumed that two PRS configurations are provided in a per-cell OTDOA configuration.

In this case, a prsInfo1 information element and a prsInfo2 information element for each PRS configuration may have specific PRS configuration information differently set as shown in Table 11.

TABLE 11

| Parameter | PRS configuration1 (prsInfo1) | PRS configuration1 (prsInfo2) |
|---|---|---|
| Prs-Bandwidth($N_{RB}^{PRS}$) | 100RB | 100RB |
| No. of Consecutive slots($N_{PRS}$) | 6 | 4 |
| PRS periodicity($T_{PRS}$) | 160 ms | 40 ms |
| PRS slot offset($\Delta_{PRS}$) | $N_A$ ms | $N_S$ ms |
| PRS numerology($\Delta f$, SCS) | 15 kHz | 30 kHz |
| ... | ... | ... |

That is, when multiple PRS configurations are set for a single UE, the UE may select a PRS configuration to measure an RSTD and may feed back the RSTD. Here, in a feedback field, an additional indication field illustrated in Embodiment 2 may be added for feedback, in which case a value indicating the PRS configuration selected by the UE may be included. For example, when PRS configuration 1 is used for RSTD measurement in Cells 1, 2, . . . , 10, '0' is indicated, and when PRS configuration 2 is used for RSTD measurement in Cells 11, 12, . . . , 20, '1' is indicated.

Figure 21:
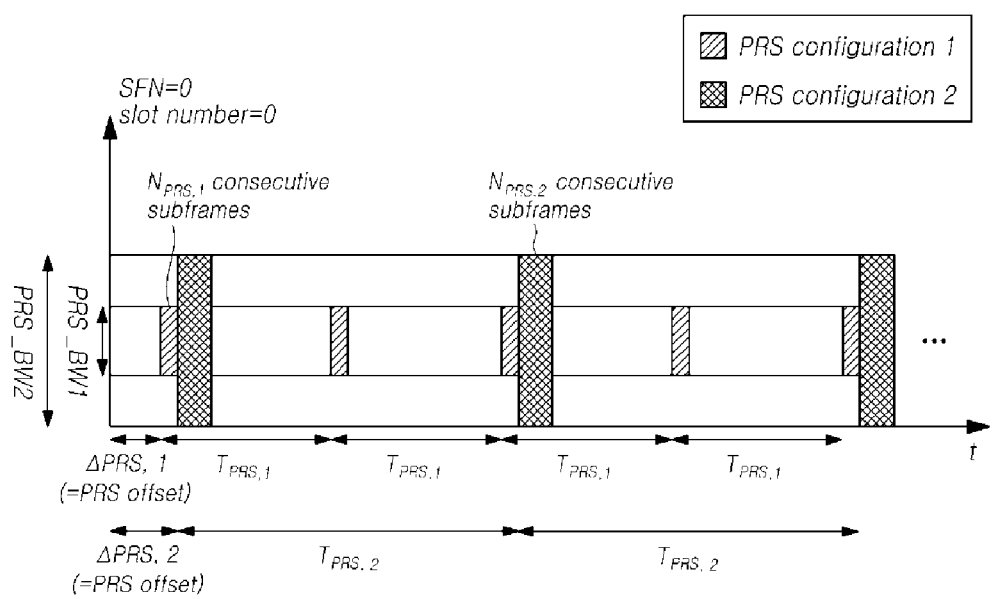
FIG. 21 is a view illustrating an example of the configuration of multiple positioning reference signals in accordance with an embodiment.

Further, in the present disclosure, the PRS configurations may be set to have the same value of SCS, that is, numerology, in which case PRS configurations with different periods may be possible. In addition, an allocated PRS transmission band and the number NpRs of consecutive slots mapped to NR PRSs may also be set differently. For example, as illustrated in FIG. 21, PRS configuration 1 and PRS configuration 2 having different periods may be set. Here, PRS transmission bands may be overlapped through PRS offset adjustment. Further, the number NpRs of consecutive slots for transmitting a PRS may also be set differently. Accordingly, the UE may selectively set a PRS configuration in view of capability thereof.

For example, a UE with a low UE class may use PRS configuration 1 of FIG. 21 to detect a PRS transmitted in a narrow band, and a UE with a high UE class may use PRS configuration 2. For example, a PRS configuration to be used may be periodically signaled by a base station to the UE. In addition, when the UE selects a PRS configuration and performs an OTDOA, information about a PRS configuration used for feeding back an RSTD value and a cell ID list may be included in a reporting format. Specifically, the information about the used PRS configuration may be included through the indication field illustrated in Embodiment 2. That is, the used PRS configuration may be included in the new field, and the bit size of the indication field may be determined (e.g., ceiling[$\log_2 N$]) according to the number N of multiple PRS configurations. FIG. 21 shows that different PRS transmission periods $T_{PRS}$ are set in the two PRS configurations.

Embodiment 4: An SFN Index, a Slot Index, and Numerology Information May be Additionally Included when Configuring Reference Cell Information for an OTDOA An information element shown in FIG. 22 shows a basic information format for a neighboring cell for synchronization adjustment with an OTDOA reference cell defined in an LTE PRS. This information element is information transmitted from a serving cell to a UE and is used to correct the SFNs of a reference cell and the serving cell/neighboring cells. That is, for an OTDOA, the PRS transmission timings of the individual cells need to be arranged to a criterion. To this end, a base station performs PRS transmission based on the reference cell rather than the serving cell. In the present disclosure, numerology information may be added in addition to an existing SFN index used to transmit the SFN difference between the reference cell and the serving cell/neighboring cell and fine offset information in 0.5 ms units.

In existing LTE, SCS fixed to 15 kHz is used rather than multiple numerologies. Therefore, it is possible to synchronize PRS transmission timings using only an existing SFN offset and offset information in 0.5 ms units. However, when the reference cell and the serving cell have different numerologies, an offset value interpreted based on the reference cell and an offset value interpreted based on the serving cell may be different. Therefore, as illustrated in FIG. 22, offset information of a reference cell and offset information in slots are provided in an existing LTE PRS. That is, it is possible to correct a synchronization offset difference in 1 SFN (=10 subframes=10 ms).

Accordingly, it is possible to provide a downlink PRS OTDOA configuration method for performing positioning of a UE in multiple numerologies in a next-generation radio network. In addition, it is possible to provide an OTDOA feedback method based on multiple numerologies and a method for synchronizing a reference cell and a neighboring cell.

Hereinafter, the hardware structures of a UE and a base station capable of performing some or all of the embodiments described with reference to FIG. 1 to FIG. 22 will be described with reference to drawings.

Figure 23:
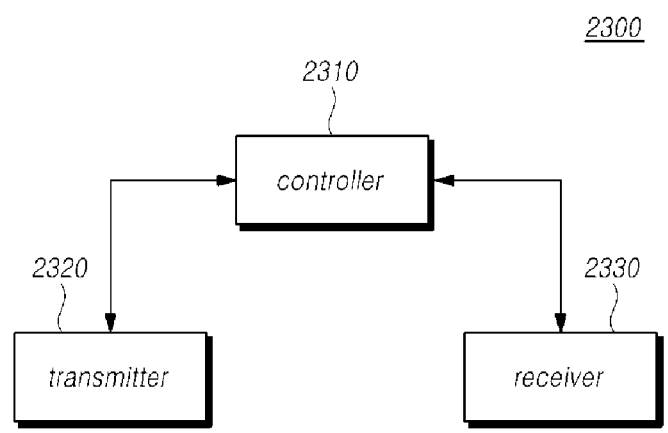
FIG. 23 is a block diagram illustrating a user equipment according to at least one embodiment of the present disclosure.

FIG. 23 is a view illustrating a UE 2300 in accordance with an embodiment.

Referring to FIG. 23, the UE 2300 according to the embodiment includes a controller 2310, a transmitter 2320, and a receiver 2330.

The controller 2310 controls the overall operation of the UE 2300 for performing positioning according to the foregoing embodiments of the present disclosure. The transmitter 2320 transmits uplink control information, data, and a message to a base station through a corresponding channel and transmits sidelink control information, data, and a message to another UE through a corresponding channel. The receiver 2330 receives downlink control information, data, and a message from the base station through a corresponding channel and receives sidelink control information, data, and a message from another UE through a corresponding channel.

The receiver 2330 may receive configuration information about a PRS including subcarrier spacing information applied when a PRS is transmitted in each cell.

The receiver 2330 may detect a PRS for OTDOA-based position estimation. To this end, the receiver 2330 may receive the configuration information about the PRS from a base station or a location server.

In NR, various numerologies may be supported. Accordingly, subcarrier spacing (SCS) may be variously set, such as 15, 30, and 60 kHz. In this case, the UE 2300 may perform OTDOA only on cells having the same SCS value and may also perform OTDOA on neighboring cells having a different SCS value from that of the serving cell.

To this end, the receiver 2330 may receive the configuration information about the PRS including the subcarrier spacing information for each cell receiving the PRS from the base station or the location server. Here, each cell may include the serving cell, neighboring cells, and a reference cell. For example, in the subcarrier spacing information for each cell, subcarrier spacing for each cell may be set to any one value of 15, 30, 60, or 120 kHz.

The receiver 2330 may receive a PRS from each cell based on the subcarrier spacing information. The controller 2310 may measure an RSTD based on the received PRS.

The receiver 2330 may receive a PRS by monitoring a PRS resource configured for each cell according to the configuration information about the PRS resource. For example, in order to measure the position of the UE, the receiver 2330 may receive a PRS from each of the serving cell and at least two neighboring cells.

When a different subcarrier spacing value is applied to each cell receiving the PRS, time for one slot is changed according to each subcarrier spacing value. Thus, it is necessary to determine an RSTD measurement criterion. That is, the transmission timings of the PRSs of the respective cells need to be arranged according to a criterion. To this end, the receiver 2330 may receive reference information as an RSTD measurement criterion from the base station.

For example, the reference information may include subcarrier spacing information and system frame number (SFN) information about transmission of a PRS. In the subcarrier spacing information included in the reference information, subcarrier spacing may be set to any one value of 15, 30, 60, or 120 kHz, and slot offset information may be set for each subcarrier spacing value.

That is, the receiver 2330 may receive subcarrier spacing information to be applied for transmission of a PRS in the reference cell and information about an SFN at which the transmission of the PRS starts. In addition, the receiver 2330 may receive subcarrier spacing information applied to transmission of a PRS from each different cell receiving the PRS and information about an SFN at which the transmission of the PRS starts.

The controller 2310 may measure an RSTD for a PRS received from each cell based on the subcarrier spacing information about transmission of the PRS, the slot offset information for the subcarrier spacing value, and the SFN information included in the reference information. That is, when the reference cell and the serving cell have different numerologies, an offset value interpreted based on the reference cell is different from an offset value interpreted based on the serving cell. Thus, it may be configured to interpret an offset value based on the reference cell.

The transmitter 2320 may report measured RSTD information to the base station. In this case, the transmitter 2320 may also report the PRS resource ID of a PRS resource for receiving a PRS used to measure the reported information and the ID of a PRS resource set including the PRS resource.

The base station may estimate an intersection area based on the received RSTD information. Accordingly, the position of the UE may be estimated.

In this manner, it is possible to provide a downlink PRS OTDOA configuration method for perfoming positioning of a UE in multiple numerologies in a next-generation radio network.

Figure 24:
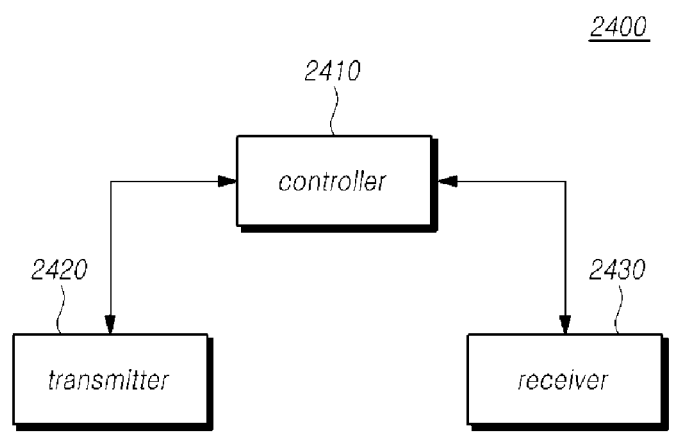
FIG. 24 is a block diagram illustrating a base station according to at least one embodiment of the present disclosure.

FIG. 24 is a view illustrating a base station 2400 in accordance with an embodiment.

Referring to FIG. 24, the base station 2400 according to the embodiment includes a controller 2410, a transmitter 2420, and a receiver 2430.

The controller 2410 controls the overall operation of the base station 2400 for performing positioning according to the foregoing embodiments of the present disclosure. The controller 2410 may identify configuration information about a transmission pattern of a PRS.

The transmitter 2420 may transmit configuration information about a PRS including subcarrier spacing information to be applied when a PRS is transmitted in each cell.

A UE may detect a PRS for OTDOA-based position estimation. To this end, the transmitter 2420 may transmit the configuration information about the PRS to the UE.

The transmitter 2420 may transmit the configuration information about the PRS including the subcarrier spacing information for each cell receiving the PRS to the UE. Here, each cell may include the serving cell, neighboring cells, and a reference cell. For example, in the subcarrier spacing information for each cell, subcarrier spacing for each cell may be set to any one value of 15, 30, 60, or 120 kHz.

The receiver 2430 may receive information about an RSTD measured by the UE according to the PRS transmitted based on the subcarrier spacing information. The controller 2410 may estimate the position of the UE based on the received information about the RSTD.

The transmitter 2420 may transmit a PRS using a PRS resource configured for each cell according to the configuration information about the PRS resource. For example, in order to measure the position of the UE, the transmitter 2420 may transmit a PRS from each of the serving cell and at least two neighboring cells to the UE.

When a different subcarrier spacing value is applied to each cell receiving the PRS, time for one slot is changed according to each subcarrier spacing value. Thus, it is necessary to determine an RSTD measurement criterion. That is, the transmission timings of the PRSs of the respective cells need to be arranged according to a criterion. To this end, the transmitter 2420 may transmit reference information as an RSTD measurement criterion to the UE.

For example, the reference information may include subcarrier spacing information and SFN information about transmission of a PRS. In the subcarrier spacing information included in the reference information, subcarrier spacing may be set to any one value of 15, 30, 60, or 120 kHz, and slot offset information may be set for each subcarrier spacing value.

That is, the transmitter 2420 may transmit subcarrier spacing information to be applied for transmission of a PRS in the reference cell and information about an SFN at which the transmission of the PRS starts. In addition, the transmitter 2420 may transmit subcarrier spacing information to be applied for transmission of a PRS from each different cell receiving the PRS and information about an SFN at which the transmission of the PRS starts.

The UE may measure an RSTD for a PRS received from each cell based on the subcarrier spacing information about transmission of the PRS, the slot offset information for the subcarrier spacing value, and the SFN information included in the reference information. That is, when the reference cell and the serving cell have different numerologies, an offset value interpreted based on the reference cell is different from an offset value interpreted based on the serving cell. Thus, it may be configured to interpret an offset value based on the reference cell.

The receiver 2430 may receive measured RSTD information from the UE. In this case, the UE may also report the PRS resource ID of a PRS resource for receiving a PRS used to measure the reported information and the ID of a PRS resource set including the PRS resource.

The controller 2410 may estimate an intersection area based on the RSTD information. Accordingly, the position of the UE may be estimated.

In this manner, it is possible to provide a downlink PRS OTDOA configuration method for performing positioning of a UE in multiple numerologies in a next-generation radio network.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed based on the accompanying claims in such a manner that all of the technical ideas included within the scope equivalent to the claims belong to the present disclosure.

What is claimed is:

1. A method for performing a positioning procedure by a user equipment (UE), the method comprising:
receiving positioning reference signal (PRS) configuration information including first subcarrier spacing information;
receiving a PRS based on the PRS configuration information through a cell;
receiving reference information as a criterion for measuring a reference signal time difference (RSTD); and
measuring the RSTD based on i) the received PRS, and ii) the received reference information including second subcarrier spacing information and system frame number (SFN) information,
wherein slot number information is set in association with the second subcarrier spacing information in the reference information,
wherein the slot number information is represented by one of integer values consisting of zero to 19, and
wherein the integer values consisting of zero to 19 are used for the second subcarrier spacing information of a slot length being 0.5 ms.

2. The method of claim 1, wherein the first subcarrier spacing information is for 15, 30, 60, or 120 kHz.

3. The method of claim 1, wherein the first subcarrier spacing information and the second subcarrier spacing information are independent from each other.

4. The method of claim 1, wherein the second subcarrier spacing information is for 30 kHz.

5. The method of claim 1, wherein the PRS configuration information further includes PRS slot offset and periodicity information in association with the first subcarrier spacing information.

6. A method for performing a positioning procedure by a base station, the method comprising:
transmitting positioning reference signal (PRS) configuration information including first subcarrier spacing information;
transmitting a PRS to a user equipment (UE) through a cell;
transmitting reference information as a criterion for measuring a reference signal time difference (RSTD) to the UE;
receiving information about the RSTD measured by the UE according to i) the PRS transmitted based on the PRS configuration information, and ii) the reference information; and
estimating a position of the UE based on the received information about the RSTD,
wherein the reference information includes second subcarrier spacing information and system frame number (SFN) information,
wherein slot number information is set in association with the second subcarrier spacing information in the reference information,
wherein the slot number information is represented by one of integer values consisting of zero to 19, and
wherein the integer values consisting of zero to 19 are used for the second subcarrier spacing information of a slot length being 0.5 ms.

7. The method of claim 6, wherein the first subcarrier spacing information is for 15, 30, 60, or 120 kHz.

8. The method of claim 6, wherein the first subcarrier spacing information and the second subcarrier spacing information are independent from each other.

9. The method of claim 6, wherein the second subcarrier spacing information is for 30 kHz.

10. The method of claim 6, wherein PRS configuration information further includes PRS slot offset and periodicity information in association with the first subcarrier spacing information.

11. A user equipment (UE) for performing a positioning procedure, the UE comprising:
a receiver configured to receive positioning reference signal (PRS) configuration information including first subcarrier spacing information, to receive a PRS based on the PRS configuration information through a cell, and to receive reference information as a criterion for measuring a reference signal time difference (RSTD);
a controller configured to measure the RSTD based on i) the received PRS, and ii) the received reference information; and
a transmitter configured to transmit information about the measured RSTD,
wherein the reference information includes second subcarrier spacing information and system frame number (SFN) information,
wherein slot number information is set in association with the second subcarrier spacing information in the reference information,
wherein the slot number information is represented by one of integer values consisting of zero to 19, and
wherein the integer values consisting of zero to 19 are used for the second subcarrier spacing information of a slot length being 0.5 ms.

12. The UE of claim 11, wherein the first subcarrier spacing information is for 15, 30, 60, or 120 kHz.

13. The UE of claim 11, wherein the first subcarrier spacing information and the second subcarrier spacing information are independent from each other.

14. The UE of claim 11, wherein the second subcarrier spacing information is for 30 kHz.

15. The UE of claim 11, wherein PRS configuration information further includes PRS slot offset and periodicity information in association with the first subcarrier spacing information.

* * * * *